June 19, 1962 N. C. POWRIE 3,039,322
VARIABLE MECHANICAL ADVANTAGE LEVER
Filed Feb. 24, 1959
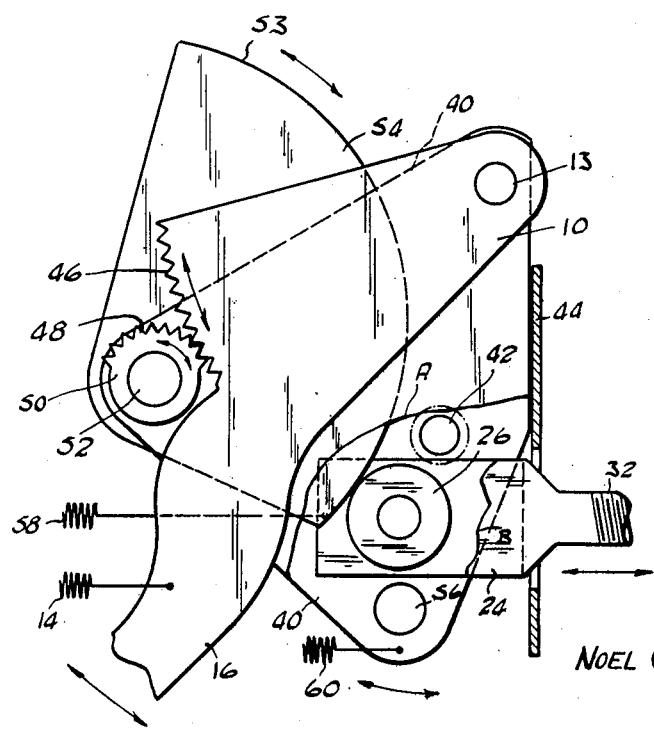
NOEL C. POWRIE
Inventor
By Wenderoth, Lind
and Ponack
Attorneys United States Patent Office 3,039,322
Patented June 19, 1962

3,039,322
VARIABLE MECHANICAL ADVANTAGE LEVER
Noel Carlisle Powrie, Blue Bend, Nahoon Mouth, East
London, Cape Province, Union of South Africa
Filed Feb. 24, 1959, Ser. No. 795,259
Claims priority, application Union of South Africa
Feb. 24, 1958
4 Claims. (Cl. 74—516)

This invention relates to a lever having a variable mechanical advantage, particularly in its application to brake pedals in motor vehicles.

It is an object of this invention to provide a brake pedal lever system which will allow auxiliary servo brake systems in motor vehicles to be dispensed with.

According to the invention, a lever system includes a pitman and a lever pivotally mounted about a fulcrum axis, the lever having an effort arm and a working arm for exerting a force on the pitman against a resistance in response to an applied effort, the lever mechanical advantage being variable automatically during the application of the effort by altering means associated with the working arm engaging with the pitman, and varying the ratio of the effective lengths of the arms.

The lever is preferably a pendant lever, i.e., the fulcrum axis lies above the point of application of the effort, and is operable by foot. The altering means includes a biassed frame supporting the lever fulcrum and mounted to pivot about an axis parallel to the lever fulcrum axis, the frame being arcuately displaceable about the frame pivotal axis against the bias together with the effort arm in response to an applied effort, the point of engagement between working arm and pitman being nearer to the frame pivotal axis than to the lever fulcrum axis. An arm abuts against a stop on the frame, after the pitman has been displaced a predetermined amount.

The altering means also includes a toothed segment arcuately displaceable about the lever fulcrum axis in response to an applied effort, the segment teeth engaging with a pivotally mounted toothed pinion arcuately displaceable about the pinion pivotal axis, together with an associated cam when the pinion is arcuately displaced, the cam engaging with the pitman.

The pitman may be a member subjected to tensile or compressive forces, depending upon the arrangement, and is preferably provided with a roller for engaging a cam face.

Further features of the invention will become apparent from the following description of specific embodiments with reference to the drawings and from the claims.

The FIGURE shows the invention in diagrammatic part elevation.

The embodiment shown in the FIGURE is suitable for use with a vehicle braking system and shows a pendant lever generally designated by 10 mounted to pivot about a fulcrum pin 13 supported in frame 40 mounted to pivot about frame pin 42 supported by bracket 44. Pendant lever 10 is provided with a segment having teeth 46 engaging with teeth 48 of pinion segment 50 mounted to pivot about pinion pin 52 supported by frame 40. Uniform lift cam 54 is attached to and arcuately displaceable with pinion segment 50 when the lever 10 is arcuately displaced about its fulcrum axis in response to an applied effort. The face 53 of cam 54 engages with roller 26 of pitman 24. The frame has a double wall, part of which is shown broken away at A to show the internal arrangement of parts. One arm of clevis shaped pitman 24 is shown broken away at B to show the internal arrangement of parts and of the engagement between cam face 53 and roller 26. The pitman 24 is guided with clearance, for lateral displacement, between frame pin 42 and guide pin 56, and is biassed towards an initial position by tension spring 58. The frame 40 is similarly biassed by tension spring 60 and the lever arm 16 by tension spring 14.

In the operation of the embodiment shown in the FIGURE, arcuate displacement of the lever 10 about its fulcrum axis causes the pinion segment 50 to pivot and the cam 54 with it, the cam face engaging with the roller 26 of pitman 24 and displacing the pitman. A relatively small displacement of the lever is multiplied by the segment and pinion to give a relatively large displacement of the pitman through the cam. The pitman is operably connected to the master cylinder of a vehicle hydraulic braking system, and the initial displacement of the pitman is designed to take up all the slack and clearance in the brake system, i.e. to bring the brake shoes into contact with the brake drums. Further displacement of the pitman causes the brake shoes to bear up under pressure against the brake drums. As soon as the pressure in the hydraulic system exceeds a predetermined value, i.e. the resistance offered by the pitman exceeds a predetermined value, then the lever 10 locks relative to the frame 40 through the cam, and the lever and frame pivot in unison about the axis of frame pin 42.

The pitman resistance at which the frame 40 and lever start to pivot together about the frame pin 42, is determined by the strength of the tension spring 60 biassing the frame, and this resistance may be so determined that the pedal pressure does not exceed a convenient value, say 50 lb. As soon as the frame and lever start pivoting together about frame pin 42, then the lever system has a greater mechanical advantage than before because the pitman is much closer to frame pin 42 than to lever fulcrum pin 13, and a greater force may be exerted on the pitman with a relatively constant applied force.

It will be appreciated that as wear takes place, so the cam will be displaced more and more before the lever changes to its high mechanical advantage. In this way, the lever takes up wear automatically at the expense of comparatively little pedal lever movement, and yet automatically provides a high mechanical advantage when actual braking force is required.

I claim:

1. A lever system comprising a toothed segment, means pivotally supporting said toothed segment for rotation about an axis, a lever arm fast with the segment and having means for receiving an applied effort, a toothed pinion in mesh with the segment, a cam secured to said toothed pinion and having a cam face, means rotatably supporting the pinion for rotation about its axis with said axis parallel to the axis of rotation of the segment, a pitman having a follower coacting with the cam face, guide means guiding the pitman linearly in a direction along its length, and bias means maintaining the follower in coacting engagement with the cam face; whereby pivotal displacement of the lever arm and segment about the pivoted axis of the segment causes the pinion and cam face to be displaced about the axis of the pinion and causes the cam face to displace the follower and hence the pitman linearly in a direction along the length of the pitman.

2. A lever system according to claim 1 in which the follower is provided at one end of the pitman and in which connecting means are provided at the other end of the pitman for close coupling to a hydraulic cylinder, in which the guide means comprise a pair of spaced shoes one on either side of the pitman, and in which the pitman has faces engaging with the shoes.

3. A lever system according to claim 2 in which the shoes comprise rollers, and means rotatably supporting the rollers about their axes and with said axes parallel to the axes of rotation of said segment and pinion.

4. A lever system according to claim 1 in which the pitman engaging means is a roller mounted for rotating about an axis at right angles to the direction of pitman displacement, and in which the cam face has a curvature which causes the force exerted by the cam to increase progressively with arcuate displacement of the cam about the axes of rotation of the pinion, from a low value for an initial level arm position to a higher value for a second lever arm position.

References Cited in the file of this patent

UNITED STATES PATENTS

| | | |
|---|---|---|
| 497,090 | Corning | May 9, 1893 |
| 667,094 | Kirk | Jan. 29, 1901 |
| 2,071,658 | Roberts | Feb. 23, 1937 |
| 2,112,607 | Pooley | Mar. 29, 1938 |
| 2,190,972 | Boldt | Feb. 20, 1940 |
| 2,350,866 | Barth | June 6, 1944 |
| 2,977,817 | Panasewicz | Apr. 4, 1961 |
| 2,986,428 | Clements | May 30, 1961 |

FOREIGN PATENTS

| | | |
|---|---|---|
| 588,739 | France | Feb. 6, 1925 |
| 636,453 | France | Jan. 12, 1928 |
| 1,179,579 | France | Dec. 22, 1958 |